(12) United States Patent
Suhara et al.

(10) Patent No.: US 7,785,742 B2
(45) Date of Patent: *Aug. 31, 2010

(54) LITHIUM-NICKEL-COBALT-MANGANESE CONTAINING COMPOSITE OXIDE

(75) Inventors: Manabu Suhara, Chigasaki (JP); Takuya Mihara, Chigasaki (JP); Koichiro Ueda, Chigasaki (JP); Yukimitsu Wakasugi, Chigasaki (JP)

(73) Assignee: Seimi Chemical Co., Ltd., Chigasaki-Shi, Kanagawa-Ken (JP)

( * ) Notice: Subject to any disclaimer, the term of this patent is extended or adjusted under 35 U.S.C. 154(b) by 79 days.

This patent is subject to a terminal disclaimer.

(21) Appl. No.: 12/081,801

(22) Filed: Apr. 22, 2008

(65) Prior Publication Data

US 2008/0241053 A1    Oct. 2, 2008

Related U.S. Application Data

(63) Continuation of application No. 10/530,331, filed as application No. PCT/JP2004/003827 on Mar. 22, 2004, now Pat. No. 7,384,706.

(30) Foreign Application Priority Data

Apr. 17, 2003 (JP) .............................. 2003-112946

(51) Int. Cl.
- *H01M 4/131* (2010.01)
- *H01M 4/525* (2010.01)
- *C01G 45/12* (2006.01)
- *C01G 51/04* (2006.01)
- *C01G 53/04* (2006.01)

(52) U.S. Cl. .................... 429/223; 429/224; 429/231.3; 423/464; 423/594.4; 423/594.6; 423/599

(58) Field of Classification Search ............... 423/594.3, 423/594.4, 594.5, 594.6, 464, 599; 429/223, 429/224, 231.1, 231.3, 231.95
See application file for complete search history.

(56) References Cited

U.S. PATENT DOCUMENTS

| | | | |
|---|---|---|---|
| 6,613,479 B2 * | 9/2003 | Fukuzawa et al. | 429/231.95 |
| 7,381,498 B2 * | 6/2008 | Suhara et al. | 429/231.95 |
| 7,384,706 B2 * | 6/2008 | Suhara et al. | 429/231.3 X |
| 2004/0091779 A1 * | 5/2004 | Kang et al. | 429/231.1 |
| 2006/0057466 A1 * | 3/2006 | Suhara et al. | 429/322 |

FOREIGN PATENT DOCUMENTS

JP   2002-184402   * 6/2002

* cited by examiner

*Primary Examiner*—Stephen J. Kalafut
(74) *Attorney, Agent, or Firm*—Manabu Kanesaka

(57) ABSTRACT

Coagulated particles of nickel-cobalt-manganese hydroxide wherein primary particles are coagulated to form secondary particles are synthesized by allowing an aqueous solution of a nickel-cobalt-manganese salt, an aqueous solution of an alkali-metal hydroxide, and an ammonium-ion donor to react under specific conditions; and a lithium-nickel-cobalt-manganese-containing composite oxide represented by a general formula, $Li_pNi_xMn_{1-x-y}Co_yO_{2-q}F_q$ (where $0.98 \leq p \leq 1.07$, $0.3 \leq x \leq 0.5$, $0.1 \leq y \leq 0.38$, and $0 \leq q \leq 0.05$), which is a positive electrode active material for a lithium secondary cell having a wide usable voltage range, a charge-discharge cycle durability, a high capacity and high safety, is obtained by dry-blending coagulated particles of nickel-cobalt-manganese composite oxyhydroxide formed by making an oxidant to act on the coagulated particles with a lithium salt, and firing the mixture in an oxygen-containing atmosphere.

4 Claims, 2 Drawing Sheets

LITHIUM-NICKEL-COBALT-MANGANESE CONTAINING COMPOSITE OXIDE

CROSS REFERENCE TO RELATED APPLICATION

This is a continuation application of patent application Ser. No. 10/530,331 filed on Apr. 5, 2005, now Pat. No. 7,384,706, which is based on International Application No. PCT/JP2004/003827, filed Mar. 22, 2004, and claims priority from, Japan Application Number 2003-112946, filed Apr. 17, 2003, the disclosure of which is hereby incorporated by reference herein in its entirety.

BACKGROUND OF THE INVENTION AND RELATED ART STATEMENT

The present invention relates to an improved lithium-nickel-cobalt-manganese-containing composite oxide used as a positive-pole active material for a lithium secondary cell.

In recent years, with increase in the production of portable and cordless equipment, expectation to small, lightweight nonaqueous-electrolyte secondary cells having high energy density has increased. As active materials for nonaqueous-electrolyte secondary cells, composite oxides of lithium and a transition metal, such as $LiCoO_2$, $LiNiO_2$, $LiMn_2O_4$ and $LiMnO_2$, have been known.

Among these, especially in these days, researches for composite oxides of lithium and manganese, as highly safe and inexpensive materials, have been actively conducted, and using these as positive electrode active materials, the development of nonaqueous-electrolyte secondary cells having high voltage and high energy density, in combination with anode active materials such as carbon materials that can occlude and discharge lithium.

In general, positive electrode active materials used in non-aqueous-electrolyte secondary cells consist of composite oxides wherein a transition metal, chiefly such as cobalt, nickel and manganese, is dissolved in lithium, which is a major active material. The electrode characteristics, such as capacitance, reversibility, operating voltage and safety, depend on the kind of the transition metals to be used.

For example, nonaqueous-electrolyte secondary cells using R-3m rhombohedral rocksalt layered composite oxide, wherein cobalt or nickel is dissolved, such as $LiCoO_2$ and $LiNi_{0.8}Co_{0.2}O_2$, can achieve as relatively high capacity density as 140 to 160 mAh/g and 180 to 200 mAh/g, respectively, and exhibits good reversibility at such a high voltage range as 2.7 to 4.3V.

However, when the cell is warmed, there are problems that the cell generates heat easily due to the reaction of the positive electrode active material with the solvent of the electrolyte during charging, or the costs of the active material are high because cobalt or nickel is expensive.

Japanese Patent Application Publication No. H10-27611 proposes, for example, $LiNi_{0.75}Co_{0.20}Mn_{0.05}O_2$ for improving the characteristics of $LiNi_{0.8}Co_{0.2}O_2$, and discloses a manufacturing method utilizing the ammonium complex of the positive electrode active material intermediate thereof. Although Japanese Patent Application Publication No. H10-81521 proposes a manufacturing method using a chelating agent of a nickel-manganese binary hydroxide material for a lithium cell having a specific grain-size distribution, no positive electrode active materials that satisfy charge and discharge capacity, cycle durability and safety at the same time can be obtained from these patent applications.

Japanese Patent Application Publication No. 2002-201028 and Japanese Patent Application Publication No. 2003-59490 propose a coprecipitated nickel-cobalt-manganese hydroxide as a material of the lithium-nickel-cobalt-manganese-containing composite oxide.

However, when the coprecipitated nickel-cobalt-manganese hydroxide is allowed to react with a lithium compound to produce the target lithium-nickel-cobalt-manganese-containing composite oxide, although reaction with lithium occurs relatively rapidly if lithium hydroxide is used as the lithium compound, in the case of using lithium hydroxide, sintering proceeds excessively by one-stage firing at 800 to 1000° C., and uniform reaction with lithium is difficult. This caused the problems of inferior initial discharge efficiency, initial discharge capacity and charge-discharge cycle durability of the obtained lithium-containing composite oxide.

In order to avoid these problems, it was required to perform firing once at 500 to 700° C., and after the fired product was crashed, to further perform firing at 800 to 1000° C. There was another problem that not only lithium hydroxide is more expensive than lithium carbonate, but also process costs for intermediate crushing, multistage firing and the like are high.

On the other hand, when inexpensive lithium carbonate was used as a lithium compound, the reaction with lithium is slow, and it was difficult to manufacture lithium-nickel-cobalt-manganese-containing composite oxide having desired cell characteristics industrially.

Japanese Patent Application Publication No. 2003-86182 proposes a method wherein a nickel-manganese-cobalt composite hydroxide is fired at 400° C. for 5 hours, mixed with lithium hydroxide, and fired. However,. since this synthesizing method has disadvantages that a step for firing the material hydroxide makes the process complicated, the manufacturing costs become high, and expensive lithium hydroxide material is used.

On the other hand, although a nonaqueous-electrolyte secondary cell using a spinel composite oxide consisting of $LiMn_2O_4$ produced from relatively inexpensive manganese material is relatively hard to generate heat from the cell due to the reaction of the positive electrode active material with the electrolyte solvent during its charge, there is a problem that the capacity is as low as 100 to 120 mAh/g compared with the above-described cobalt-based and nickel-based active materials, and the charge-discharge cycle durability is poor, as well as a problem of quick deterioration at a low voltage range of below 3 V.

In addition, although there are examples that cells using $LiMnO_2$, $LiMn_{0.95}Cr_{0.05}O_2$ or $LiMn_{0.9}Al_{0.1}O_2$ of an orthorhombic Pmnm system or monoclinic C2/m system have high safety, and manifest a high initial capacity, there is a problem that the crystal structure easily changes concurrent with charge-discharge cycles, and cycle durability is insufficient.

Therefore, the present invention has been devised to solve such problems, and the object thereof is to provide a highly safe positive electrode material for a nonaqueous-electrolyte secondary cell that enables the use within a wide voltage range, has a high capacity, and excels in charge-discharge cycle durability.

Further objects and advantages of the invention will be apparent from the following description of the invention.

SUMMARY OF THE INVENTION

In order to achieve the above object, the present invention provides a lithium-nickel-cobalt-manganese-containing composite oxide represented by a general formula, $Li_pNi_xMn_{1-x-y}Co_yO_{2-q}F_q$ (where $0.98 \leq p \leq 1.07$, $0.3 \leq x \leq 0.5$, $0.1 \leq y \leq 0.38$, and $0 \leq q \leq 0.05$), formed by synthesizing coagulated particles of a nickel-cobalt-manganese composite hydroxide wherein primary particles obtained by precipitating the nickel-cobalt-manganese composite hydroxide are coagulated to form secondary particles, by supplying an aqueous solution of a nickel-cobalt-manganese salt, an aqueous solution of an alkali-metal hydroxide and an ammonium-ion donor continuously or intermittently to a reaction system, and making the reaction proceed in the state wherein the temperature of said reaction system is substantially constant within a range between 30 and 70° C., and pH is maintained at a substantially constant value within a range between 10 and 13; synthesizing coagulated particles of a nickel-cobalt-manganese composite oxyhydroxide by making an oxidant act on said coagulated composite hydroxide particles; and-dry-blending at least said composite oxyhydroxide and a lithium salt, and firing the mixture in an oxygen-containing atmosphere (hereafter, may be simply referred to as lithium-containing composite oxide).

In the above formula, $Li_pNi_xMn_{1-x-y}Co_yO_{2-q}F_q$, p below 0.98 is not preferable because the service capacity lowers; and p above 1.07 is not preferable because the service capacity lowers, and gas generation in the cell when charged increases. x below 0.3 is not preferable because it is difficult to form a stable R-3m rhombohedral structure; and x above 0.5 is not preferable because safety lowers. Preferably, x between 0.32 and 0.42 is adopted. y below 0.1 is not preferable because the initial charge-discharge efficiency lowers; and y above 0.38 is not preferable because safety lowers. Preferably, y is between 0.23 and 0.35. From the point of view to enhance safety, it is preferable that fluorine is contained. q above 0.05 is not preferable because the service capacity lowers. Preferably, q is between 0.005 and 0.02. Further in the present invention, the atomic ratio of Ni and Mn of 1±0.05 is preferable, because the cell characteristics are improved.

Concerning the compressed powder density, it is preferable that the compressed powder density of the lithium-containing composite oxide according to the present invention is 2.6 g/cm³ or more. It is also preferable that the crystal structure thereof is an R-3m rhombohedral structure.

The lithium-containing composite oxide of the present invention can be obtained by mixing the coagulated particles of the above-described nickel-cobalt-manganese composite oxyhydroxide and a lithium salt, and firing the mixture preferably at 800 to 1050° C. for 4 to 40 hours. As the lithium salt used in the reaction, lithium hydroxide, lithium carbonate and lithium oxide are exemplified.

According to the present invention, there is also provided a material for a positive electrode active material for a lithium secondary cell consisting of coagulated particles of a nickel-cobalt-manganese composite oxyhydroxide represented by a general formula, $Ni_xMn_{1-x-y}Co_yOOH$ (where $0.3 \leq x \leq 0.5$, and $0.1 \leq y \leq 0.38$), formed by synthesizing coagulated particles of a nickel-cobalt-manganese composite hydroxide wherein primary particles obtained by precipitating the nickel-cobalt-manganese composite hydroxide are coagulated to form secondary particles, by supplying an aqueous solution of a nickel-cobalt-manganese salt, an aqueous solution of an alkali-metal hydroxide and an ammonium-ion donor continuously or intermittently to a reaction system, and making the reaction proceed in the state wherein the temperature of said reaction system is substantially constant within a range between 30 and 70° C., and pH is maintained at a substantially constant value within a range between 10 and 13; and making an oxidant act on said composite hydroxide.

It is preferable that the specific surface area of the above-described coagulated particles of a nickel-cobalt-manganese composite oxyhydroxide is 4 to 30 m²/g. It is also preferable that the compressed powder density is 2.0 g/cm³ or more, and the half-value width of the diffraction peak when 2θ is 19±1° in X-ray diffraction using Cu—Kα lines is 0.3 to 0.5°.

DETAILED DESCRIPTION OF THE PREFERRED EMBODIMENTS

Figure 1:
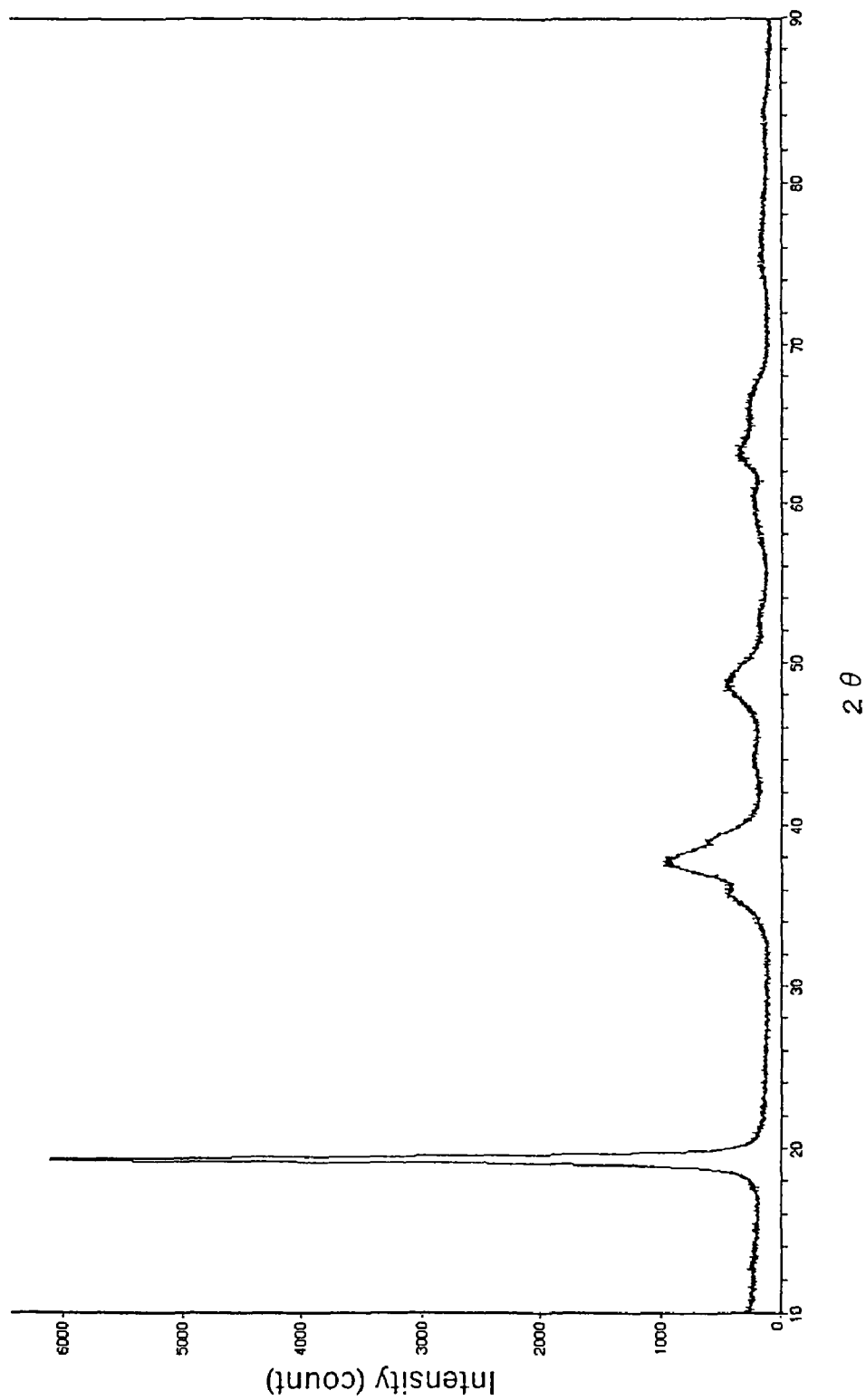
FIG. 1 is a graph of XRD diffraction spectra of coagulated particles of a nickel-manganese-cobalt co-precipitated oxyhydroxide obtained in Example 1 of the present invention.

In the present invention, a lithium-nickel-cobalt-manganese-containing composite oxide is synthesized by synthesizing coagulated particles of a nickel-cobalt-manganese composite hydroxide wherein primary particles obtained by precipitating the nickel-cobalt-manganese composite hydroxide are coagulated to form secondary particles, by supplying an aqueous solution of a nickel-cobalt-manganese salt, an aqueous solution of an alkali-metal hydroxide and an ammonium-ion donor continuously or intermittently to a reaction system, and making the reaction proceed in the state wherein the temperature of said reaction system is substantially constant within a range between 30 and 70° C., and pH is maintained at a substantially constant value within a range between 10 and 13, and then by mixing a lithium salt with coagulated particles of a nickel-cobalt-manganese composite oxyhydroxide which is obtained by making an oxidant act on said composite hydroxide, and firing the mixture.

As the aqueous solution of a nickel-cobalt-manganese salt used in the synthesis of the coagulated particles of a nickel-cobalt-manganese composite hydroxide, a sulfate-mixed aqueous solution, a nitrate-mixed aqueous solution, an oxalate-mixed aqueous solution, and a chloride-mixed aqueous solution are exemplified. The concentration of the metal salt in the mixed aqueous solution of a nickel-cobalt-manganese salt supplied to the reaction system is preferably 0.5 to 2.5 mol/L (liter).

As an aqueous solution of an alkali metal hydroxide supplied to the reaction system, the aqueous solution of sodium hydroxide, potassium hydroxide or lithium hydroxide is preferably exemplified. The concentration of the aqueous solution of an alkali metal hydroxide is preferably 15 to 35 mol/L.

An ammonium ion donor is required for obtaining a dense spherical composite hydroxide by forming a complex salt with nickel or the like. As the ammonium ion donor, ammonia water, the aqueous solution of ammonium sulfate, ammonium nitrate or the like is preferably exemplified. The concentration of ammonia or ammonium ions is preferably 2 to 20 mol/L.

A method for manufacturing the coagulated particles of a nickel-cobalt-manganese composite hydroxide will be more specifically described. A mixed aqueous solution of a nickel-cobalt-manganese salt, an aqueous solution of an alkali metal hydroxide and an ammonium ion donor are continuously or intermittently supplied to a reaction vessel, and while vigorously agitating the slurry in the reaction vessel, the temperature of the slurry in the reaction vessel is controlled to a constant temperature within a range between 30 to 70° C. (margin of fluctuation: ±2° C., preferably ±0.5° C.). If the temperature is below 30° C., the precipitation reaction is retarded, and spherical particles are hard to obtain. The temperature above 70° C. is not preferable, because a large quantity of energy is required. A particularly preferable reaction temperature is a constant temperature selected within a range between 40 and 60° C.

The pH of the slurry in the reaction vessel is maintained by controlling the supplying rate of the aqueous solution of an alkali metal hydroxide so that a constant pH within a range between 10 and 13 (margin of fluctuation: ±0.1, preferably ±0.05) is obtained. The pH below 10 is not preferable because crystals are excessively grown. The pH exceeding 13 is not preferable because ammonia is easily vaporized and the quantity of fine particles increases.

The retention time in the reaction vessel is preferably 0.5 to 30 hours, and more preferably 5 to 15 hours. The slurry concentration is preferably 500 to 1200 g/L. The slurry concentration less than 500 g/L is not preferable because the filling ability of formed particles lowers. The slurry concentration exceeding 1200 g/L is not preferable because the agitation of the slurry becomes difficult. The nickel ion concentration in the slurry is preferably 100 ppm or less, and more preferably 30 ppm or less. The excessively high nickel ion concentration is not preferable because crystals are excessively grown.

By adequately controlling the temperature, pH, retention time, slurry concentration, and ion concentration in the slurry, coagulated particles of a nickel-cobalt-mnanganese composite hydroxide having a desired average particle diameter, particle diameter distribution, and particle density can be obtained. Using a method of multistage reaction rather than single-stage reaction, a dense spherical intermediate product having an average particle diameter of 4 to 12 μm and a preferable particle-size distribution can be obtained.

A powder (particle) nickel-cobalt-manganese composite hydroxide is obtained by supplying an aqueous solution of a nickel-cobalt-manganese salt, an aqueous solution of an alkali metal hydroxide, and an ammonium-ion donor each continuously or intermittently to a reaction vessel; overflowing or extracting the slurry containing the particles of the nickel-cobalt-manganese composite hydroxide formed by the reaction continuously or intermittently from the reaction vessel; and filtering the slurry and washing the particles with water. Part of the particles of the produced nickel-cobalt-manganese composite hydroxide may be returned to the reaction vessel for controlling the properties of the produced particles.

The coagulated particles of a nickel-cobalt-manganese composite oxyhydroxide are obtained by allowing an oxidant to act to the coagulated particles of the nickel-cobalt-manganese composite hydroxide.

Specifically, the coagulated particles of a nickel-cobalt-manganese composite oxyhydroxide are synthesized by allowing an oxidant such as dissolved air to coexist in the slurry in the reaction vessel for synthesizing the nickel-cobalt-manganese composite hydroxide, or forming a slurry by dispersing a nickel-cobalt-manganese composite hydroxide in an aqueous solution, supplying air, sodium hypochlorite, hydrogen peroxide, potassium persulfate, bromine or the like as the oxidant, allowing to react at 10 to 60° C. for 5 to 20 hours, and filtering and washing the coagulated particles of the obtained nickel-cobalt-manganese composite hydroxide. When sodium hypochlorite, potassium persulfate, bromine or the like is used as the oxidant, the coprecipitate of oxidized $Ni_x.Mn_{t-x-y}.Co_yOOH$ having an average metallic valance of about 3 is obtained.

The compressed powder density of the coagulated particles of the nickel-cobalt-manganese composite oxyhydroxide is preferably 2.0 g/cm$^3$ or more. The compressed powder density less than 2.0 g/cm$^3$ is not preferable because it becomes difficult to elevate the compressed density when fired together with a lithium salt. The particularly preferable compressed powder density is 2.2 g/cm$^3$ or more. The compressed powder density of the coagulated particles of the nickel-cobalt-manganese composite oxyhydroxide is preferably substantially spherical, and the average particle diameter, D50, thereof is preferably 3 to 15 μm.

The average valence of the metal in the coagulated particles of the nickel-cobalt-manganese composite oxyhydroxide is preferably 2.6 or more. The average valence less than 2.6 is not preferable because the rate of reaction with lithium carbonate lowers. The average valence is particularly preferably 2.8 to 3.2.

In the present invention, although lithium carbonate, lithium hydroxide and lithium oxide are exemplified as the lithium salt, inexpensive lithium carbonate is particularly preferable. The lithium carbonate is preferably of a powder form having an average particle diameter of 1 to 50 μm.

The compressed powder density when the powder of a lithium-nickel-cobalt-manganese composite oxide according to the present invention is compressed under a pressure of 0.96 t/cm$^2$ is preferably 2.6 g/cm$^3$, and thereby, the slurry can be formed by mixing a binder and a solvent with the powder of the active material, and the volumetric capacity when applied to the aluminum-foil collector, dried and pressed can be elevated.

The compressed powder density of the lithium-nickel-cobalt-manganese composite oxide according to the present invention is preferably 2.9 g/cm$^3$ or more. The compressed powder density of 2.9 g/cm$^3$ or more can be achieved by optimizing the particle-size distribution of the powder. Specifically, high density can be achieved when the particle-diameter distribution is wide, the volume of the small particle diameter is 20 to 50%, and the particle-diameter distribution of the large particle diameter is narrow.

In the present invention, although the target lithium-containing composite oxide is synthesized by mixing a nickel-cobalt-manganese composite oxyhydroxide as a material with a lithium compound and fired, the cell characteristics can be improved by substituting a part of nickel, cobalt and manganese by other metal elements. As other metal elements, Al, Mg, Zr, Ti, Sn and Fe are exemplified. The suitable substituting quantity is 0.1 to 10% the total number of the nickel, cobalt and manganese atoms.

In the lithium-nickel-cobalt-manganese containing composite oxide according to the present invention, when a part of oxygen atoms is substituted by fluorine, the mixture formed by adding a fluorine compound to the lithium compound is used and fired. As the fluorine compound, lithium fluoride, ammonium fluoride, nickel fluoride and cobalt fluoride can be exemplified. A fluoriding agent, such as fluorine chloride, fluorine gas, hydrogen fluoride gas, and nitrogen trifluoride, can be allowed to react.

The lithium-nickel-cobalt-manganese containing composite oxide according to the present invention can be obtained, for example, by firing the mixture of the powder of the above-described nickel-cobalt-manganese composite oxyhydroxide and a lithium compound in an oxygen-containing atmosphere using a solid-phase method at 800 to 1050° C. for 4 to 40 hours. Firing can be performed in multiple stages as required.

It is preferable that the lithium-containing composite oxide for the lithium secondary cell is an active material having an R-3m rhombohedral structure especially from the aspect of charge-discharge cycle stability. The atmosphere of firing is preferably an oxygen-containing atmosphere, and thereby high-performance cell characteristics can be obtained. Although the reaction with lithium itself proceeds even in the atmospheric air, the oxygen concentration is preferably 25% or more for improving cell characteristics, and more preferably 40% or more.

A positive electrode compound is formed by mixing a carbon-based conducting material, such as acetylene black, graphite and kitchen black, and a binder to the powder of the lithium-containing composite oxide of the present invention. As the binder, polyvinylidene fluoride, polytetrafluoroethylene, polyamide, carboxymethyl cellulose, acrylic resins or the like is used. A slurry consisting of the powder of the lithium-containing composite oxide of the present invention, the conducting material, the binder and the solvent or dispersion medium of the binder is applied to a positive-electrode collector such as aluminum foil, dried, and compressed to form the layer of the positive-electrode active material on the positive-electrode collector.

In a lithium cell having the above-described positive-electrode active material, a carbonate ester is preferably used as the solvent for the electrolyte solution. The carbonate ester may be either cyclic or chain. As the cyclic carbonate ester, propylene carbonate, ethylene carbonate or the like is exemplified. As the chain carbonate ester, dimethyl carbonate, diethyl carbonate, ethylmethyl carbonate, methylpropyl carbonate, metylisopropyl carbonate or the like is exemplified.

Two or more above-described carbonate esters can be used in combination. They can also be used in combination with other solvents. Depending on the type of the negative-electrode active material, the combined use of a chain carbonate ester and a cyclic carbonate ester may improve discharge characteristics, cycle durability and charge-discharge efficiency. A gel polymer electrolyte may also be formed by adding a vinylidene fluoride-hexafluoropropylen copolymer (e.g., KYNAR of ELF Atochem), and a vinylidene fluoride-perfluoropropyl vinyl ether copolymer to these organic solvents, and adding the following solute.

As the solute, one or more lithium salt whose anion is $ClO_4^-$, $CF_3SO_3^-$, $BF_4^-$, $PF_6^-$, $AsF_6^-$, $SbF_6^-$, $CF_3CO_2^-$, $(CF_3SO_2)_2N^-$ and the like can be preferably used. It is preferable that the above-described electrolyte solution or polymer electrolyte is formed by adding an electrolyte consisting of a lithium salt to the above-described solvent or solvent-containing polymer in a concentration of 0.2 to 2.0 mol/L. If the concentration is beyond this range, the ionic conductance lowers, and the electric conductivity of the electrolyte lowers. More preferably, a concentration of 0.5 to 1.5 mol/L is selected. As a separator, a porous polyethylene or porous polypropylene film is used.

As the negative-electrode active material, a material that can absorb and release lithium ions is used. Although the material forming the negative-electrode active material is not specifically limited, for example, lithium metal, lithium alloys, carbonic materials, oxides based on a metal in group 14 or 15 of the periodic table, carbon compounds, silicon carbide compounds, silicon oxide compounds, titanium sulfide, boron carbide compounds and the like can be listed.

As carbonic materials, pyrolytic products of organic matters under various pyrolytic conditions, artificial graphite, natural graphite, soil graphite, expanded graphite, flake graphite or the like can be used. As oxides, compounds based on tin oxide can be used. As negative-electrode collector, a copper foil, nickel foil or the like is used.

It is preferable that the positive electrode and the negative electrode are formed by kneading an active material with an organic solvent to form a slurry, applying the slurry onto a metal-foil collector, drying and compressing. The shape of the lithium cell is not specifically limited. A sheet form (i.e., film form), folded form, winding cylindrical form with a bottom, button form or the like can be selected as usage.

EXAMPLES

Next, the present invention will be described about specific Example 1 and Example 2; however, the present invention is not limited to these examples.

Example 1

In a 2-L (liter) reaction vessel, ion-exchanged water is poured, and agitated at 400 rpm while maintaining the internal temperature at 50±1° C. To this, while supplying an aqueous solution of metal sulfates containing 1.5 mol/L of nickel sulfate, 1.5 mol/L of manganese sulfate and 1.5 mol/L of cobalt sulfate at a flow rate of 0.4 L/hr; and simultaneously supplying a 1.5 mol/L aqueous solution of ammonium sulfate at a flow rate of 0.03 L/hr; an 18 mol/L aqueous solution of sodium hydroxide was continuously supplied so that the pH in the reaction vessel was maintained at 11.05±0.05. The mother liquor in the reaction vessel was periodically extracted, and the slurry was concentrated until the final slurry concentration became about 700 g/L. The nickel concentration in the periodically extracted mother liquor from the reaction vessel was 20 ppm. After the target slurry concentration had been obtained, the slurry was aged at 50° C. for 5 hours, filtration and water washing were repeated to obtain coagulated spherical particles of a co-precipitated nickel-manganese-cobalt hydroxide of an average particle diameter of 4 μm.

To 60 parts by weight of an aqueous solution containing 0.071 mol/L of potassium peroxodisulfate and 1 mole/L of sodium hydroxide, 1 part by weight of the coagulated particles of the co-precipitated nickel-manganese-cobalt hydroxide was mixed, and agitated at 15° C. for 8 hours.

After the reaction, filtration and water washing were repeated and drying performed to obtain the coagulated particle powder of a co-precipitated nickel-manganese-cobalt oxyhydroxide, $N_{1/3}Mn_{1/3}Co_{1/3}OOH$.

FIG. 1 shows the XRD diffraction spectra of the powder obtained in the powder X-ray diffraction at 40 kV-40 mA, a sampling interval of 0.020°, and Fourier transformation cumulative time of 2.0 seconds using Cu—Kα lines from an X-ray diffraction instrument (Model RINT2100 manufactured by Rigaku Corporation). From FIG. 1, diffraction spectra similar to those of CoOOH were confirmed. The half-value width of the diffraction peak at 2θ near 19° was 0.401°.

From the result of titration of the coagulated particle powder of a co-precipitated nickel-manganese-cobalt oxyhydroxide dissolved in a 20% by weight aqueous solution of sulfuric acid with a 0.1 mol/L $KMn_2O_7$ solution under the coexistence of $Fe^{2+}$, it was confirmed that the average valence of the obtained coagulated particle powder of a co-precipitated nickel-manganese-cobalt oxyhydroxide was 2.97, and had primarily the oxyhydroxide-based composition.

Figure 2:
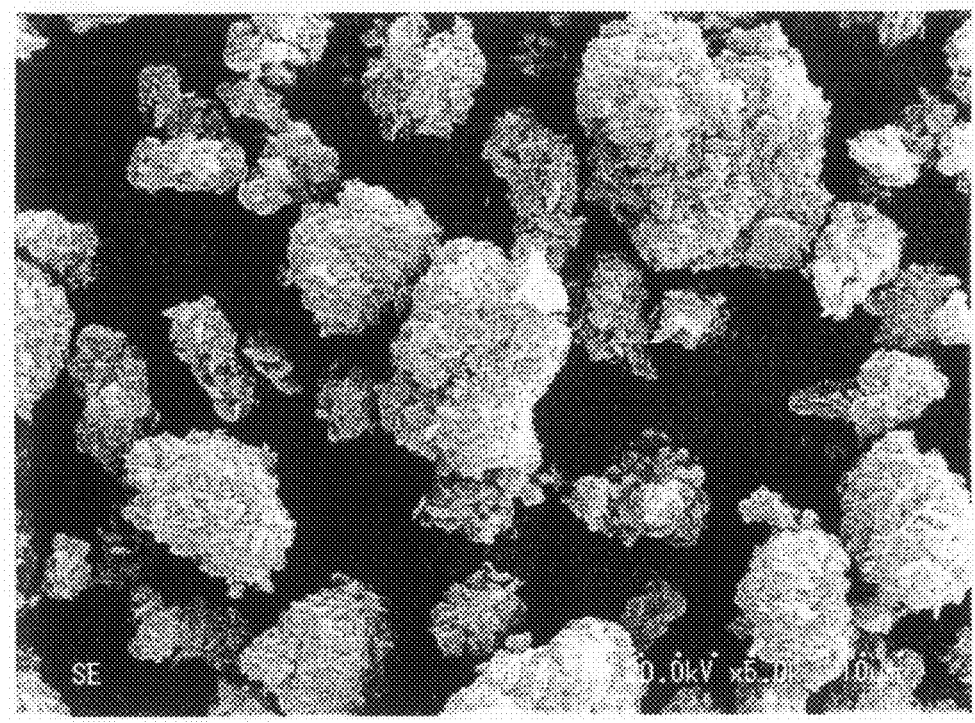
FIG. 2 is an SEM photograph (5,000× magnification) of coagulated particles of a nickel-manganese-cobalt co-precipitated oxyhydroxide obtained in Example 1 of the present invention.
Figure 3:
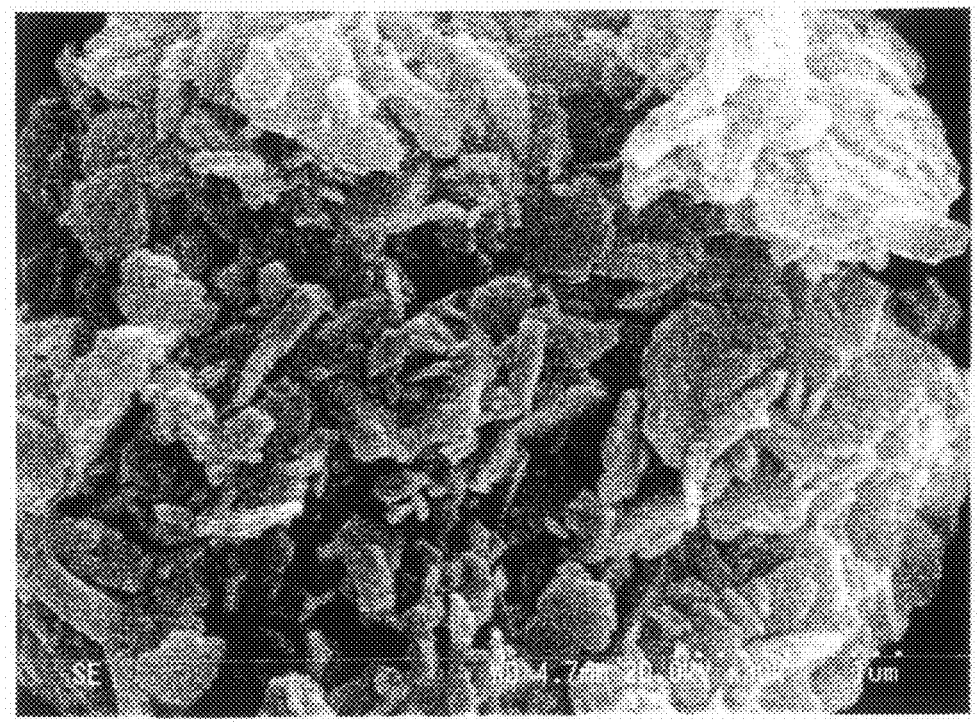
FIG. 3 is an SEM photograph (30,000× magnification) of coagulated particles of a nickel-manganese-cobalt co-precipitated oxyhydroxide obtained in Example 1 of the present invention.

The average particle diameter of the coagulated particle powder of a co-precipitated nickel-manganese-cobalt oxyhydroxide was 4 μm. The specific surface area measured using a BET method was 13.3 m²/g. The SEM photographs of the powder are shown in FIGS. 2 and 3. FIG. 2 shows a photograph of 5,000 times magnification, and FIG. 3 shows a photograph of 30,000 times magnification. Thereby, it is known that a large number of scale-like primary particles having a size of 0.1 to 0.5 µm are coagulated to form secondary particles.

The compressed powder density obtained from the volume and weight of the coagulated particle powder of a co-precipitated nickel-manganese-cobalt oxyhydroxide hydraulically compressed under a pressure of 0.96 t/cm$^2$ was 2.13 g/cm$^3$.

The coagulated particle powder of a co-precipitated nickel-manganese-cobalt oxyhydroxide was mixed with lithium carbonate powder, fired at 900° C. in an atmosphere containing 40% by volume of oxygen, and ground to synthesize $LiNi_{1/3}Mn_{1/3}Co_{1/3}O_2$ having an average particle diameter of 6.5 µm. As a result of the X-ray diffraction analysis of the powder by Cu—Kα, it was known that the powder has an R-3m rhombohedral layered rocksalt structure.

The compressed powder density of the $LiNi_{1/3}Mn_{1/3}Co_{1/3}O_2$ powder obtained from the volume and weight of the $LiNi_{1/3}Mn_{1/3}Co_{1/3}O_2$ hydraulically compressed under a pressure of 0.96 t/cm$^2$ was 2.6 g/cm$^3$.

While adding $LiNi_{1/3}Mn_{1/3}Co_{1/3}O_2$ powder, acetylene black and polyvinylidene fluoride to N-methyl pyrrolidone at the weight ratio of 83/10/7, they were mixed in a ball mill to form a slurry.

The slurry was applied onto an aluminum-foil positive-electrode collector of a thickness of 20 µm, and dried at 150° C. to remove N-methyl pyrrolidone. Thereafter, roll-press rolling was performed to obtain a positive-electrode body.

For a separator, porous polyethylene of a thickness of 25 µm was used; for a negative-electrode collector, a nickel foil was used by using a metal lithium foil of a thickness of 300 µm for a negative electrode; and for an electrolyte, 1M-LiPF$_6$/EC+DEC (1:1) was used to assemble a 2030-type coin cell in an argon glove box.

In an ambient temperature of 50° C., a charge-discharge cycle test, wherein constant-current charge was performed for 1 g of the positive-electrode active material at 30 mA to 4.3 V, and constant-current discharge was performed for 1 g of the positive-electrode active material at 30 mA to 2.7 V, was carried out 20 times; and the capacity-maintaining rate was obtained from the ratio of the discharge capacity after 2 times charge and discharge to the discharge capacity after 20 times charge and discharge.

In an ambient temperature of 25° C., for the evaluation of cell safety, the cell after charging to 4.3 V was disassembled, the positive electrode was placed as a sample together with ethylene carbonate in a closed container, and the starting temperature of heat generation when temperature was raised using a differential scanning calorimeter was obtained.

The initial capacity was 164 mAh/g, the capacity-maintaining rate was 94%, and the starting temperature of heat generation was 238° C.

Example 2

In a 2-L (liter) reaction vessel, 1.8 L of the mother liquor obtained in the above-described Example 1 was poured, and agitated at 250 rpm while maintaining the internal temperature at 50±1° C. To this, while supplying an aqueous solution of metal sulfates containing 1.5 mol/L of nickel sulfate, 1.5 mol/L of manganese sulfate and 1.5 mol/L of cobalt sulfate at a flow rate of 0.4 L/hr; and simultaneously supplying a 1.5 mol/L aqueous solution of ammonium sulfate at a flow rate of 0.03 L/hr; an 18 mol/L aqueous solution of sodium hydroxide was continuously supplied so that the pH in the reaction vessel was maintained at 11.05±0.05. The mother liquor in the reaction vessel was periodically extracted, and the slurry was concentrated until the final slurry concentration became about 1000 g/L. The nickel concentration in the periodically extracted mother liquor from the reaction vessel was 22 ppm. After the target slurry concentration had been obtained, the slurry was aged at 50° C. for 5 hours, filtration and water washing were repeated to obtain coagulated particles of a co-precipitated nickel-manganese-cobalt hydroxide.

In the same manner as in Example 1, the obtained coagulated particles of a co-precipitated nickel-manganese-cobalt hydroxide was treated with potassium peroxodisulfate and sodium hydroxide to obtain the coagulated particle powder of a co-precipitated nickel-manganese-cobalt oxyhydroxide, $Ni_{1/3}Mn_{1/3}Co_{1/3}OOH$.

It was confirmed that the XRD diffraction spectra obtained in the X-ray diffraction were similar to those of CoOOH, and the half-value width of the diffraction peak at 2θ near 19° was 0.396°.

It was also confirmed that the average valence of the obtained coagulated particle powder of a co-precipitated nickel-manganese-cobalt oxyhydroxide measured in the same manner as in the above-described Example 1 was 2.95, and had primarily the oxyhydroxide-based composition.

The average particle diameter of the coagulated particle powder of a co-precipitated nickel-manganese-cobalt oxyhydroxide was 9 µm; and the specific surface area measured using a BET method was 8.5 m$^2$/g. The compressed powder density obtained from the volume and weight of the coagulated particle powder of a co-precipitated nickel-manganese-cobalt oxyhydroxide hydraulically compressed under a pressure of 0.96 t/cm$^2$ was 2.19 g/cm$^3$.

The coagulated particle powder of a co-precipitated nickel-manganese-cobalt oxyhydroxide was mixed with lithium carbonate powder, fired at 900° C. in an atmosphere containing 50% by volume of oxygen, and ground to synthesize $LiNi_{1/3}Mn_{1/3}Co_{1/3}O_2$ having an average particle diameter of 10 µm. As a result of the X-ray diffraction analysis of the powder by Cu—Kα, it was known that the powder has an R-3m rhombohedral layered rocksalt structure.

The compressed powder density of the $LiNi_{1/3}Mn_{1/3}Co_{1/3}O_2$ powder obtained from the volume and weight of the $LiNi_{1/3}Mn_{1/3}Co_{1/3}O_2$ hydraulically compressed under a pressure of 0.96 t/cm$^2$ was 2.7 g/cm$^3$.

Using the $LiNi_{1/3}Mn_{1/3}Co_{1/3}O_2$ powder, a coin cell was fabricated in the same manner as in the above-described Example 1, in an ambient temperature of 50° C., a charge-discharge cycle test, wherein constant-current charge was performed for 1 g of the positive-electrode active material at 30 mA to 4.3 V, and constant-current discharge was performed for 1 g of the positive-electrode active material at 30 mA to 2.7 V, was carried out 20 times; and the capacity-maintaining rate was obtained from the ratio of the discharge capacity after 2 times charge and discharge to the discharge capacity after 20 times charge and discharge.

In an ambient temperature of 25° C., for the evaluation of cell safety, the cell after charging to 4.3 V was disassembled, the positive electrode was placed as a sample together with ethylene carbonate in a closed container, and the starting temperature of heat generation when temperature was raised using a differential scanning calorimeter was obtained.

The initial capacity was 162 mAh/g, the capacity-maintaining rate was 95%, and the starting temperature of heat generation was 240° C.

INDUSTRIAL APPLICABILITY

As described above, when the lithium-containing composite oxide of the present invention is utilized as an active material in a secondary cell, a cell that enable the use within a wide voltage range, has a high capacity, excels in charge-discharge cycle durability, and is highly safe, can be obtained.

While the invention has been explained with reference to the specific embodiments of the invention, the explanation is illustrative and the invention is limited only by the appended claims.

What is claimed is:

1. A lithium-nickel-cobalt-manganese-containing composite oxide represented by a general formula, $Li_pNi_xMn_{1-x-y}Co_yO_{2-q}F_q$ (where $0.98 \leq p \leq 1.07$, $0.3 \leq x \leq 0.5$, $1/3 \leq y \leq 0.38$, and $0 \leq q \leq 0.05$), formed by synthesizing coagulated particles of a nickel-cobalt-manganese composite hydroxide wherein primary particles obtained by precipitating the nickel-cobalt-manganese composite hydroxide are coagulated to form secondary particles, by supplying an aqueous solution of a nickel-cobalt-manganese salt, an aqueous solution of an alkali-metal hydroxide and an ammonium-ion donor continuously or intermittently to a reaction system, and making the reaction proceed in the state wherein the temperature of said reaction system is substantially constant within a range between 30 and 70° C., and pH is maintained at a substantially constant value within a range between 10 and 13; synthesizing coagulated particles of a nickel-cobalt-manganese composite oxyhydroxide by making an oxidant act on said coagulated composite hydroxide particles; and dry-blending at least said composite oxyhydroxide and a lithium salt, and firing the mixture in an oxygen-containing atmosphere, wherein an atomic ratio of Ni and Mn is 1±0.05.

2. The lithium-nickel-cobalt-manganese-containing composite oxide according to claim 1, wherein the compressed powder has a density of 2.6 g/cm² or more.

3. The lithium-nickel-cobalt-manganese-containing composite oxide according to claim 1, wherein the composite oxide has an R-3m rhombohedral structure.

4. The lithium-nickel-cobalt-manganese-containing composite oxide according to claim 1, wherein x has a range of $0.32 \leq x \leq 0.42$.

* * * * *